(12) United States Patent
Bert

(10) Patent No.: US 12,314,181 B2
(45) Date of Patent: May 27, 2025

(54) DATA STORAGE DEVICE WITH MEMORY SERVICES FOR STORAGE ACCESS QUEUES

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/432,518

(22) Filed: Feb. 5, 2024

(65) Prior Publication Data
US 2024/0264944 A1    Aug. 8, 2024

Related U.S. Application Data

(60) Provisional application No. 63/483,824, filed on Feb. 8, 2023.

(51) Int. Cl.
*G06F 12/00* (2006.01)
*G06F 12/0815* (2016.01)
(Continued)

(52) U.S. Cl.
CPC ...... *G06F 12/0877* (2013.01); *G06F 12/0815* (2013.01); *G06F 12/123* (2013.01)

(58) Field of Classification Search
CPC ............. G06F 12/0877; G06F 12/0815; G06F 12/123; G06F 3/061; G06F 12/0835;
(Continued)

(56) References Cited

U.S. PATENT DOCUMENTS

2003/0033474 A1\* 2/2003 Lin ................. G06F 3/0659
711/111
2015/0261434 A1\* 9/2015 Kagan ................ G06F 13/28
711/103

(Continued)

FOREIGN PATENT DOCUMENTS

CN        111373362 A  \*  7/2020   .......... G06F 11/1076

OTHER PUBLICATIONS

International Search Report and Written Opinion, PCT/US2024/014796, mailed on May 23, 2024.

*Primary Examiner* — Shawn X Gu
*Assistant Examiner* — Mohammad S Hasan
(74) *Attorney, Agent, or Firm* — Greenberg Traurig

(57) ABSTRACT

A computing device having a computer express link (CXL) connection between a memory sub-system and a host system and having storage access queues configured at least in part in the memory sub-system. The memory sub-system can attach, as a memory device, a portion of its fast random access memory over the connection to the host system. One or more storage access queues can be configured in the memory device. The host system can use a cache-coherent memory access protocol to communicate storage access messages over the connection to the random access memory of the memory sub-system. Optionally, the host system can have a memory with second storage access queues usable to access the storage services of the memory sub-system over the connection using a storage access protocol.

20 Claims, 8 Drawing Sheets

(51) Int. Cl.
*G06F 12/0877* (2016.01)
*G06F 12/123* (2016.01)

(58) Field of Classification Search
CPC .. G06F 12/0868; G06F 3/0659; G06F 9/5016; G06F 2212/1024; G06F 2212/214; G06F 2212/282; G06F 2212/313; G06F 2212/466; G06F 2212/621
See application file for complete search history.

(56) References Cited

U.S. PATENT DOCUMENTS

| | | | |
|---|---|---|---|
| 2017/0004101 A1* | 1/2017 | Shao | G06F 13/28 |
| 2018/0157540 A1* | 6/2018 | Yoneoka | G06F 1/3228 |
| 2021/0278998 A1 | 9/2021 | Li | |
| 2021/0374056 A1 | 12/2021 | Malladi et al. | |
| 2021/0374080 A1 | 12/2021 | Horwich et al. | |
| 2022/0179818 A1 | 6/2022 | Natu | |
| 2022/0358042 A1 | 11/2022 | Malladi et al. | |
| 2022/0391136 A1* | 12/2022 | Veluswamy | G06F 3/0659 |
| 2023/0281128 A1* | 9/2023 | Huangfu | G06F 3/0659 |
| 2023/0315621 A1* | 10/2023 | Bahirat | G06F 12/0835 |
| 2024/0118839 A1* | 4/2024 | Kim | G06F 3/0611 |

* cited by examiner

DATA STORAGE DEVICE WITH MEMORY SERVICES FOR STORAGE ACCESS QUEUES

RELATED APPLICATIONS

The present application claims priority to Prov. U.S. Pat. App. Ser. No. 63/483,824 filed Feb. 8, 2023, the entire disclosures of which application are hereby incorporated herein by reference.

TECHNICAL FIELD

At least some embodiments disclosed herein relate to memory systems in general, and more particularly, but not limited to memory systems configured to be accessible for memory services and storage services.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
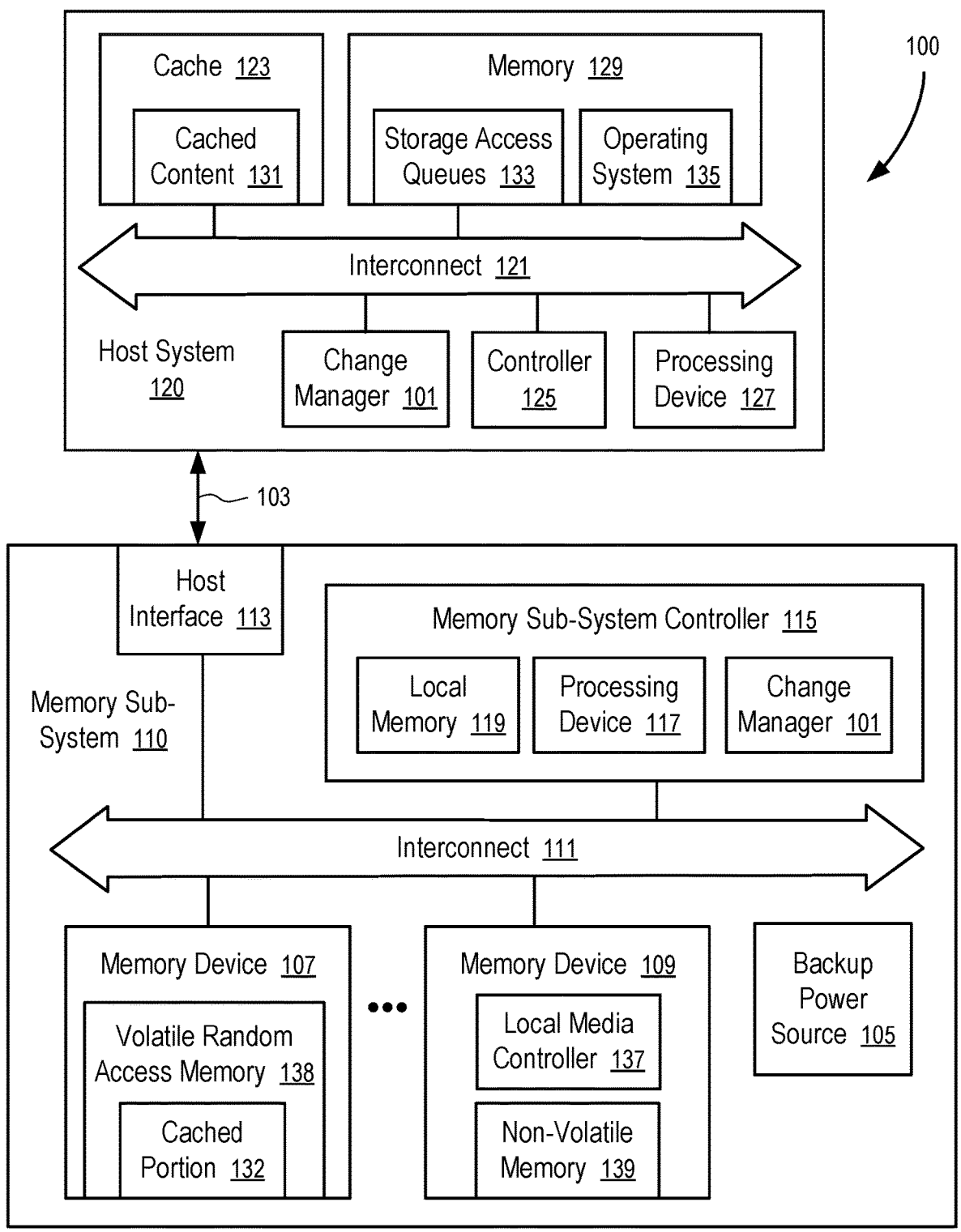
FIG. 1 illustrates an example computing system having a memory sub-system in accordance with some embodiments of the present disclosure.

At least some aspects of the present disclosure are directed to a solid-state drive (SSD) that can provide both memory services and storage services over a physical connection to a host system. The solid-state drive can allocate a portion of its fast memory (e.g., dynamic random access memory (DRAM)) and attach the allocated portion as a memory device to the host system. At least a portion of storage access queues for can be configured in the memory device, provided by the portion of faster memory of the solid-state drive. The host system can use the storage access queues to access storage services, such as the storage capacity attached by the solid-state drive as a storage device over the physical connection to the host system.

For example, a host system and a memory sub-system (e.g., a solid-state drive (SSD)) can be connected via a physical connection according to a computer component interconnect standard of compute express link (CXL). Compute express link (CXL) includes protocols for storage access (e.g., cxl.io), and protocols for cache-coherent memory access (e.g., cxl.mem and cxl.cache). Thus, a memory sub-system can be configured to provide both storage services and memory services to the host system over the physical connection using compute express link (CXL).

A typical solid-state drive (SSD) is configured or designed as a non-volatile storage device that preserves the entire set of data received from a host system in an event of unexpected power failure. The solid-state drive can have volatile memory (e.g., SRAM or DRAM) used as a buffer in processing storage access messages received from a host system (e.g., read commands, write commands). To prevent data loss in a power failure event, the solid-state drive is typically configured with an internal backup power source such that, in the event of power failure, the solid-state drive can continue operations for a limited period of time to save the data, buffered in the volatile memory (e.g., SRAM or DRAM), into non-volatile memory (e.g., NAND). When the limited period of time is sufficient to guarantee the preservation of the data in the volatile memory (e.g., SRAM or DRAM) during a power failure event, the volatile memory as backed by the backup power source can be considered non-volatile from the point of view of the host system. Typical implementations of the backup power source (e.g., capacitors, battery packs) limit the amount of volatile memory (e.g., SRAM or DRAM) configured in the solid-state drive to preserve the non-volatile characteristics of the solid-state drive as a data storage device. When functions of such volatile memory are implemented via fast non-volatile memory, the backup power source can be eliminated from the solid-state drive.

When a solid-state drive is configured with a host interface that supports the protocols of compute express link, a portion of the fast, volatile memory of the solid-state drive can be optionally configured to provide cache-coherent memory services to the host system. Such memory services can be accessible via load/store instructions executed in the host system at a byte level (e.g., 64B or 128B) over the connection of computer express link. Another portion of the volatile memory of the solid-state drive can be reserved for internal use by the solid-state drive as a buffer memory to facilitate storage services to the host system. Such storage services can be accessible via read/write commands provided by the host system at a logical block level (e.g., 4 KB) over the connection of computer express link.

When such a solid-state drive (SSD) is connected via a computer express link connection to a host system, the solid-state drive can be attached and used both as a memory device and a storage device to the host system. The storage device provides a storage capacity addressable by the host system via read commands and write commands at a block level (e.g., for data records of a database); and the memory device provides a physical memory addressable by the host system via load instructions and store instructions at a byte level (e.g., for changes to data records of the database).

It is advantageous for a host system to configure at least a portion of storage access queues for accessing the storage capacity of a solid-state drive (SSD) on the memory device attached by the solid-state drive to the host system.

For example, when a solid-state drive is connected to a host system via a computer express link (CXL) connection, the host system can configure one or more storage access queues on the memory device attached by the solid-state drive to the host system.

The host system can use a cache-coherent memory access protocol to access the storage access queues in the solid-state drive. For example, storage access commands can be stored by the host system into the storage access queues in the solid-state drive to access the storage capacity of the solid-state drive.

After the host system writes storage access messages, using a cache-coherent memory access protocol over the computer express link connection, into the storage access queues in the solid-state drive, the solid-state drive can use local access to its fast, volatile memory to obtain the messages, without the need to use a memory bus external to the solid-state drive to access the storage access queues.

When the fast, volatile memory used to host the storage access queues in the solid-state drive is supported by the backup power source, the content of the storage access queues configured to access the storage capacity of the solid-state drive can be preserved when the power supply to the computer system is interrupted. Thus, the host system does not have to handle the preservation of the content in the storage access queues in response to power interruption.

Optionally, the memory space provided by the solid-state drive over a computer express link connection can be configured as non-volatile from the point of view of the host system. The memory allocated by the solid-state drive to provide the memory services over the computer express link connection can be implemented via non-volatile memory, or via volatile memory backed with a backup power supply. The backup power supply is configured to be sufficient to guarantee that, in the event of disruption to the external power supply to the solid-state drive, the solid-state drive can continue operations to save the data from the volatile memory to the non-volatile storage capacity of the solid-state drive. Thus, in the event of unexpected power disruption, the data in the memory space provided by the solid-state drive is preserved and not lost.

It is advantageous for a host system to use a communication protocol to query the solid-state drive about the memory attachment capabilities of the solid-state drive, such as whether the solid-state drive can provide cache-coherent memory services, what is the amount of memory that the solid-state drive can attach to the host system in providing memory services, how much of the memory attachable to provide the memory services can be considered non-volatile (e.g., implemented via non-volatile memory, or backed with a backup power source), what is the access time of the memory that can be allocated by the solid-state drive to the memory services, etc.

The query result can be used to configure the allocation of memory in the solid-state drive to provide cache-coherent memory services. For example, a portion of fast memory of the solid-state drive can be provided to the host system for cache-coherent memory accesses; and the remaining portion of the fast memory can be reserved by the solid-state drive for internal. The partitioning of the fast memory of the solid-state drive for different services can be configured to balance the benefit of memory services offered by the solid-state drive to the host system and the performance of storage services implemented by the solid-state drive for the host system. Optionally, the host system can explicitly request the solid-state drive to carve out a requested portion of its fast, volatile memory as memory accessible over a connection, by the host system using a cache-coherent memory access protocol according to computer express link.

For example, when the solid-state drive is connected to the host system to provide storage services over a connection of computer express link, the host system can send a command to the solid-state drive to query the memory attachment capabilities of the solid-state drive.

For example, the command to query memory attachment capabilities can be configured with a command identifier that is different from a read command; and in response, the solid-state drive is configured to provide a response indicating whether the solid-state drive is capable of operating as a memory device to provide memory services accessible via load instructions and store instructions. Further, the response can be configured to identify an amount of available memory that can be allocated and attached as the memory device accessible over the computer express link connection. Optionally, the response can be further configured to include an identification of an amount of available memory that can be considered non-volatile by the host system and be used by the host system as the memory device. The non-volatile portion of the memory device attached by the solid-state drive can be implemented via non-volatile memory, or volatile memory supported by a backup power source and the non-volatile storage capacity of the solid-state drive.

Optionally, the solid-state drive can be configured with more volatile memory than an amount backed by its backup power source. Upon disruption in the power supply to the solid-state drive, the backup power source is sufficient to store data from a portion of the volatile memory of the solid-state drive to its storage capacity, but insufficient to preserve the entire data in the volatile memory to its storage capacity. Thus, the response to the memory attachment capability query can include an indication of the ratio of volatile to non-volatile portions of the memory that can be allocated by the solid-state drive to the memory services. Optionally, the response can further include an identification of access time of the memory that can be allocated by the solid-state drive to cache-coherent memory services. For example, when the host system requests data via a cache-coherent protocol over the compute express link from the solid-state drive, the solid-state drive can provide the data in a time period that is not longer than the access time.

Optionally, a pre-configured response to such a query can be stored at a predetermined location in the storage device attached by the solid-state drive to the host system. For example, the predetermined location can be at a predetermined logical block address in a predetermined namespace. For example, the pre-configured response can be configured as part of the firmware of the solid-state drive. The host system can use a read command to retrieve the response from the predetermined location.

Optionally, when the solid-state drive has the capability of functioning as a memory device, the solid-state drive can automatically allocate a predetermined amount of its fast, volatile memory as a memory device attached over the computer express link connection to the host system. The predetermined amount can be a minimum or default amount as configured in a manufacturing facility of solid-state drives, or an amount as specified by configuration data stored in the solid-state drive. Subsequently, the memory attachment capability query can be optionally implemented in the command set of the protocol for cache-coherent memory access (instead of the command set of the protocol for storage access); and the host system can use the query to retrieve parameters specifying the memory attachment capabilities of the solid-state drive. For example, the solid-state drive can place the parameters into the memory device at predetermined memory addresses; and the host can retrieve the parameters by executing load commands with the corresponding memory addresses.

It is advantageous for a host system to customize aspects of the memory services of the memory sub-system (e.g., a solid-state drive) for the patterns of memory and storage usages of the host system.

For example, the host system can specify a size of the memory device offered by the solid-state drive for attachment to the host system, such that a set of physical memory addresses configured according to the size can be addressable via execution of load/storage instructions in the processing device(s) of the host system.

Optionally, the host system can specify the requirements on time to access the memory device over the compute express link (CXL) connection. For example, when the cache requests to access a memory location over the connection, the solid-state drive is required to provide a response within the access time specified by the host system in configuring the memory services of the solid-state drive.

Optionally, the host system can specify how much of the memory device attached by the solid-state drive is required to be non-volatile such that when an external power supply to the solid-state drive fails, the data in the non-volatile portion of the memory device attached by the solid-state drive to the host system is not lost. The non-volatile portion can be implemented by the solid-state drive via non-volatile memory, or volatile memory with a backup power source to continue operations of copying data from the volatile memory to non-volatile memory during the disruption of the external power supply to the solid-state drive.

Optionally, the host system can specify whether the solid-state drive is to attach a memory device to the host system over the compute express link (CXL) connection.

For example, the solid-state drive can have an area configured to store the configuration parameters of the memory device to be attached to the host system via the compute express link (CXL) connection. When the solid-state drive reboots, starts up, or powers up, the solid-state drive can allocate, according to the configuration parameters stored in the area, a portion of its memory resources as a memory device for attachment to the host system. After the solid-state drive configures the memory services according to the configuration parameters stored in the area, the host system can access, via the cache, through execution of load instructions and store instructions identifying the corresponding physical memory addresses. The solid-state drive can configure its remaining memory resources to provide storage services over the compute express link (CXL) connection. For example, a portion of its volatile random access memory can be allocated as a buffer memory reserved for the processing device(s) of the solid-state drive; and the buffer memory is inaccessible and non-addressable to the host system via load/store instructions.

When the solid-state drive is connected to the host system via a computer express link connection, the host system can send commands to adjust the configuration parameters stored in the area for the attachable memory device. Subsequently, the host system can request the solid-state drive to restart to attach, over the computer express link to the host system, a memory device with memory services configured according to the configuration parameters.

For example, the host system can be configured to issue a write command (or store commands) to save the configuration parameters at a predetermined logical block address (or predetermined memory addresses) in the area to customize the setting of the memory device configured to provide memory services over the computer express link connection.

Alternatively, a command having a command identifier that is different from a write command (or a store instruction) can be configured in the read-write protocol (or in the load-store protocol) to instruct the solid-state drive to adjust the configuration parameters stored in the area.

FIG. 1 illustrates an example computing system 100 that includes a memory sub-system 110 in accordance with some embodiments of the present disclosure. The memory sub-system 110 can include computer-readable storage media, such as one or more volatile memory devices (e.g., memory device 107), one or more non-volatile memory devices (e.g., memory device 109), or a combination of such.

In FIG. 1, the memory sub-system 110 is configured as a product of manufacture (e.g., a solid-state drive), usable as a component installed in a computing device.

The memory sub-system 110 further includes a host interface 113 for a physical connection 103 with a host system 120.

The host system 120 can have an interconnect 121 connecting a cache 123, a memory 129, a memory controller 125, a processing device 127, and a change manager 101 configured to use the memory services of the memory sub-system 110 to accumulate changes for storage in the storage capacity of the memory sub-system 110.

The change manager 101 in the host system 120 can be implemented at least in part via instructions executed by the processing device 127, or via logic circuit, or both. The change manager 101 in the host system 120 can use a memory device attached by the memory sub-system 110 to the host system 120 to store changes to a database, before the changes are written into a file in a storage device attached by the memory sub-system 110 to the host system 120. Optionally, the change manager 101 in the host system 120 is implemented as part of the operating system 135 of the host system 120, a database manager in the host system 120, or a device driver configured to operate the memory sub-system 110, or a combination of such software components.

The connection 103 can be in accordance with the standard of compute express link (CXL), or other communication protocols that support cache-coherent memory access and storage access. Optionally, multiple physical connections 103 are configured to support cache-coherent memory access communications and support storage access communications.

The processing device 127 can be a microprocessor configured as a central processing unit (CPU) of a computing device. Instructions (e.g., load instructions, store instructions) executed in the processing device 127 can access memory 129 via the memory controller (125) and the cache 123. Further, when the memory sub-system 110 attaches a memory device over the connection 103 to the host system, instructions (e.g., load instructions, store instructions) executed in the processing device 127 can access the memory device via the memory controller (125) and the cache 123, in a way similar to the accessing of the memory 129.

For example, in response to execution of a load instruction in the processing device 127, the memory controller 125 can convert a logical memory address specified by the instruction to a physical memory address to request the cache 123 for memory access to retrieve data. For example, the physical memory address can be in the memory 129 of the host system 120, or in the memory device attached by the memory sub-system 110 over the connection 103 to the host system 120. If the data at the physical memory address is not already in the cache 123, the cache 123 can load the data from the corresponding physical address as the cached content 131. The cache 123 can provide the cached content 131 to service the request for memory access at the physical memory address.

For example, in response to execution of a store instruction in the processing device 127, the memory controller 125 can convert a logical memory address specified by the instruction to a physical memory address to request the cache 123 for memory access to store data. The cache 123 can hold the data of the store instruction as the cached content 131 and indicate that the corresponding data at the physical memory address is out of date. When the cache 123 needs to vacate a cache block (e.g., to load new data from different memory addresses, or to hold data of store instructions of different memory addresses), the cache 123 can flush the cached content 131 from the cache block to the corresponding physical memory addresses (e.g., in the memory 129 of the host system, or in the memory device attached by the memory sub-system 110 over the connection 103 to the host system 120).

The connection 103 between the host system 120 and the memory sub-system 110 can support a cache-coherent memory access protocol. Cache coherence ensures that: changes to a copy of the data corresponding to a memory address are propagated to other copies of the data corresponding to the memory address; and load/store accesses to a same memory address are seen by processing devices (e.g., 127) in a same order.

The operating system 135 can include routines of instructions programmed to process storage access requests from applications.

In some implementations, the host system 120 configures a portion of its memory (e.g., 129) to function as storage access queues 133 for storage access messages. Such storage access messages can include read commands, write commands, erase commands, etc. A storage access command (e.g., read or write) can specify a logical block address for a data block in a storage device (e.g., attached by the memory sub-system 110 to the host system 120 over the connection 103). The storage device can retrieve the messages from the storage access queues 133, execute the commands, and provide results in the storage access queues 133 for further processing by the host system 120 (e.g., using routines in the operating system 135).

Typically, a data block addressed by a storage access command (e.g., read or write) has a size that is much bigger than a data unit accessible via a memory access instruction (e.g., load or store). Thus, storage access commands can be convenient for batch processing a large amount of data (e.g., data in a file managed by a file system) at the same time and in the same manner, with the help of the routines in the operating system 135. The memory access instructions can be efficient for accessing small pieces of data randomly without the overhead of routines in the operating system 135.

The memory sub-system 110 has an interconnect 111 connecting the host interface 113, a controller 115, and memory resources, such as memory devices 107, . . . , 109.

The controller 115 of the memory sub-system 110 can control the operations of the memory sub-system 110. For example, the operations of the memory sub-system 110 can be responsive to the storage access messages in the storage access queues 133, or responsive to memory access requests from the cache 123.

In some implementations, each of the memory devices (e.g., 107, . . . , 109) includes one or more integrated circuit devices, each enclosed in a separate integrated circuit package. In other implementations, each of the memory devices (e.g., 107, . . . , 109) is configured on an integrated circuit die; and the memory devices (e.g., 107, . . . , 109) can be configured in a same integrated circuit device enclosed within a same integrated circuit package. In further implementations, the memory sub-system 110 is implemented as an integrated circuit device having an integrated circuit package enclosing the memory devices 107, . . . , 109, the controller 115, and the host interface 113.

For example, a memory device 107 of the memory sub-system 110 can have volatile random access memory 138 that is faster than the non-volatile memory 139 of a memory device 109 of the memory sub-system 110. Thus, the non-volatile memory 139 can be used to provide the storage capacity of the memory sub-system 110 to retain data. At least a portion of the storage capacity can be used to provide storage services to the host system 120. Optionally, a portion of the volatile random access memory 138 can be used to provide cache-coherent memory services to the host system 120. The remaining portion of the volatile random access memory 138 can be used to provide buffer services to the controller 115 in processing the storage access messages in the storage access queues 133 and in performing other operations (e.g., wear leveling, garbage collection, error detection and correction, encryption).

When the volatile random address memory 138 is used to buffer data received from the host system 120 before saving into the non-volatile memory 139, the data in the volatile random address memory 138 can be lost when the power to the memory device 107 is interrupted. To prevent data loss, the memory sub-system 110 can have a backup power source 105 that can be sufficient to operate the memory sub-system 110 for a period of time to allow the controller 115 to commit the buffered data from the volatile random access memory 138 into the non-volatile memory 139 in the event of disruption of an external power supply to the memory sub-system 110.

Optionally, the fast memory 138 can be implemented via non-volatile memory (e.g., cross-point memory); and the backup power source 105 can be eliminated. Alternatively, a combination of fast non-volatile memory and fast volatile memory can be configured in the memory sub-system 110 for memory services and buffer services.

The host system 120 can send a memory attachment capability query over the connection 103 to the memory sub-system 110. In response, the memory sub-system 110 can provide a response identifying: whether the memory sub-system 110 can provide cache-coherent memory services over the connection 103, what is the amount of memory that is attachable to provide the memory services over the connection 103, how much of the memory available for the memory services to the host system 120 is considered non-volatile (e.g., implemented via non-volatile memory, or backed with a backup power source 105), what is the access time of the memory that can be allocated to the memory services to the host system 120, etc.

The host system 120 can send a request over the connection 103 to the memory sub-system 110 to configure the memory services provided by the memory sub-system 110 to the host system 120. In the request, the host system 120 can specify: whether the memory sub-system 110 is to provide cache-coherent memory services over the connection 103, what is the amount of memory that is provided as the memory services over the connection 103, how much of the memory provided over the connection 103 is considered non-volatile (e.g., implemented via non-volatile memory, or backed with a backup power source 105), what is the access time of the memory is provided as the memory services to the host system 120, etc. In response, the memory sub-system 110 can partition its resources (e.g., memory devices 107, . . . , 109) and provide the requested memory services over the connection 103.

When a portion of the memory 138 is configured to provide memory services over the connection 103, the host system 120 can access a cached portion 132 of the memory 138 via load instructions and store instructions and the cache 123. The non-volatile memory 139 can be accessed via read commands and write commands transmitted via the storage access queues 133 configured in the memory 129 of the host system 120.

Using the memory services of the memory sub-system 110 provided over the connection 103, the host system 120 can accumulate, in the memory of the subsystem (e.g., in a portion of the volatile random access memory 138), data identifying changes in a database. When the size of the accumulated change data is above a threshold, a change manager 101 can pack the change data into one or more blocks of data for one or more write commands addressing one or more logical block addresses. The change manager 101 can be implemented in the host system 120, or in the memory sub-system 110, or partially in the host system 120 and partially in the memory sub-system 110. The change manager 101 in the memory sub-system 110 can be implemented at least in part via instructions (e.g., firmware) executed by the processing device 117 of the controller 115 of the memory sub-system 110, or via logic circuit, or both.

Figure 2:
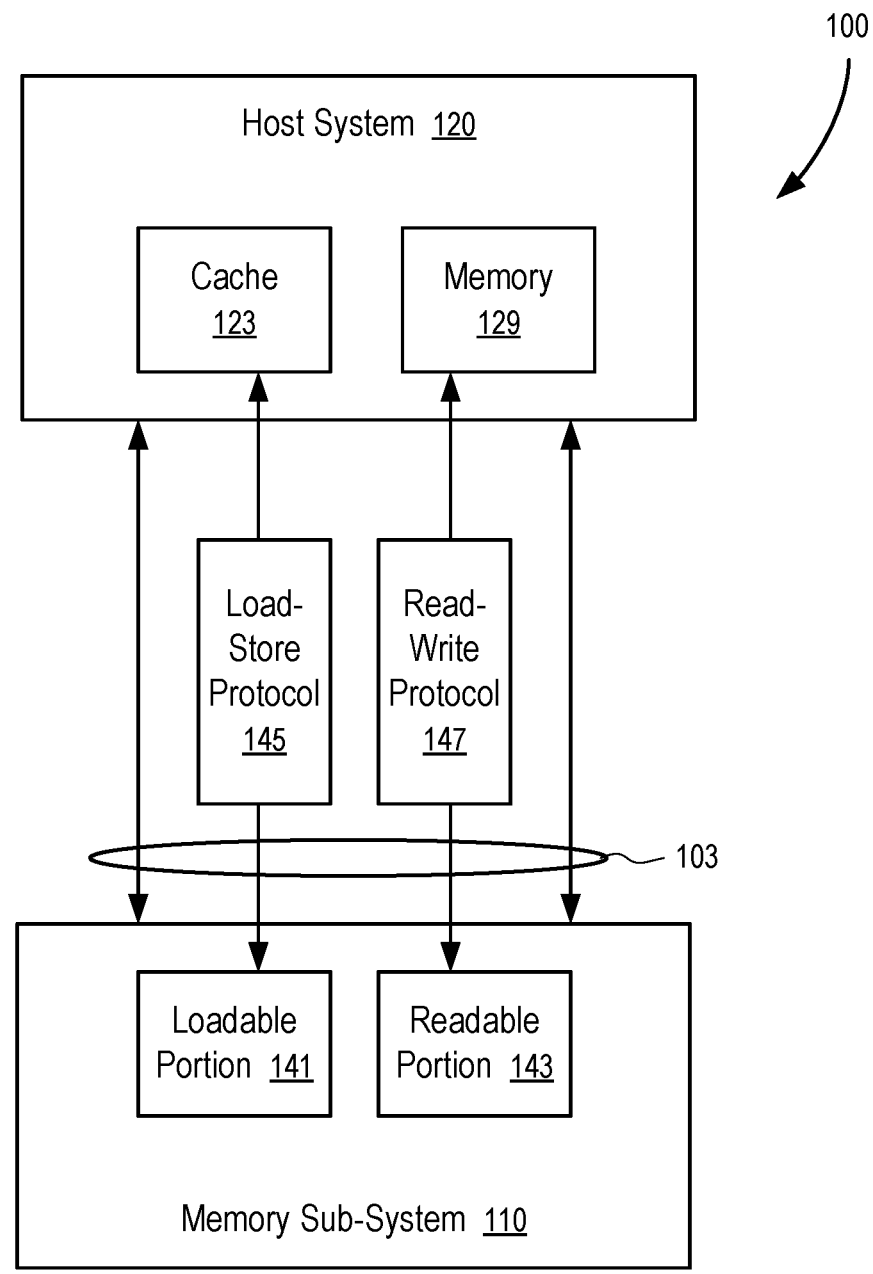
FIG. 2 shows a memory sub-system configured to offer both memory services and storage services to a host system over a physical connection according to one embodiment.

FIG. 2 shows a memory sub-system configured to offer both memory services and storage services to a host system over a physical connection according to one embodiment. For example, the memory sub-system 110 and the host system 120 of FIG. 2 can be implemented in a way as the computing system 100 of FIG. 1.

Figure 5:
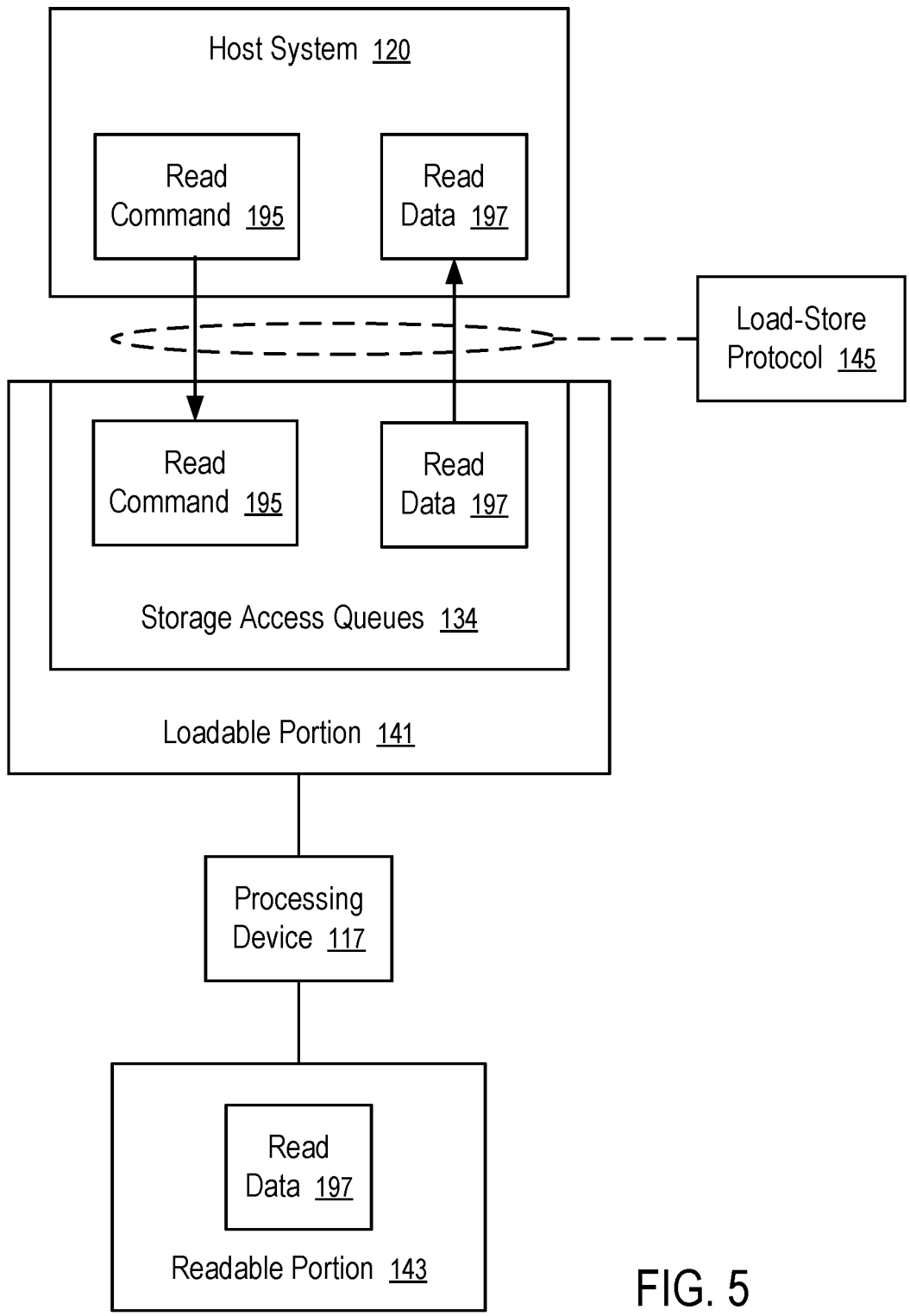
FIG. 5 illustrates the use of storage access queues in a memory sub-system to execute a read command according to one embodiment.

In FIG. 2, the memory resources (e.g., memory devices 107, . . . , 109) of the memory sub-system 110 are partitioned into a loadable portion 141 and a readable portion 143 (and an optional portion for buffer memory 149 in some cases, as in FIG. 5). A physical connection 103 between the host system 120 and the memory sub-system 110 can support a protocol 145 for load instructions and store instructions to access memory services provided in the loadable portion 141. For example, the load instructions and store instructions can be executed via the cache 123. The connection 103 can further support a protocol 147 for read commands and write commands to access storage services provided in the readable portion 143. For example, the read commands and write commands can be provide via the storage access queues 133 configured in the memory 129 of the host system 120. For example, a physical connection 103 supporting a computer express link can be used to connect the host system 120 and the memory sub-system 110.

FIG. 2 illustrates an example of a same physical connection 103 (e.g., computer express link connection) configured to facilitate both memory access communications according to a protocol 145, and storage access communications according to another protocol 147. In general, separate physical connections can be used to provide the host system 120 with memory access according to a protocol 145 for memory access, and storage access according to another protocol 147 for storage access.

Figure 3:
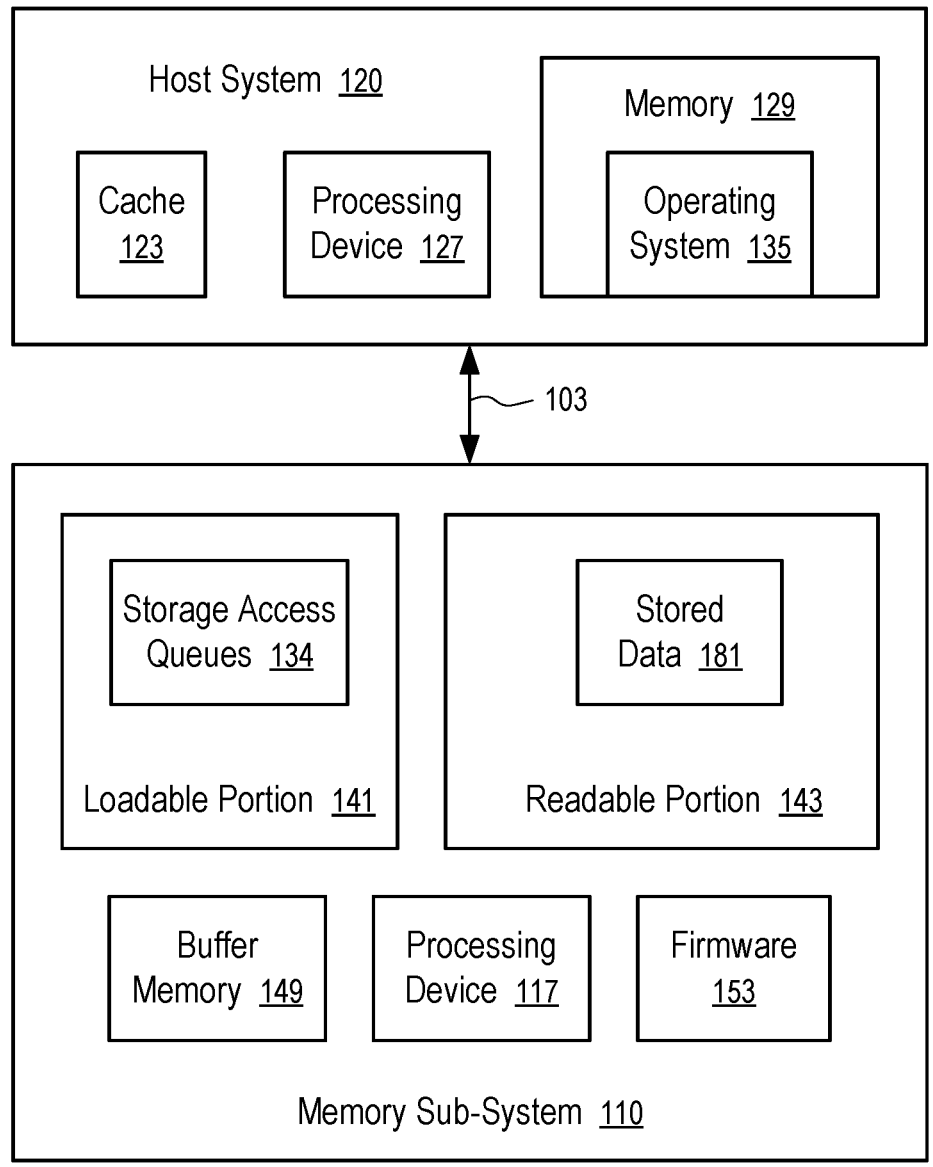
FIG. 3 shows a memory sub-system having storage access queues configured for a host system to access the storage services of the memory sub-system according to one embodiment.

FIG. 3 shows a memory sub-system having storage access queues configured for a host system to access the storage services of the memory sub-system according to one embodiment.

For example, the memory sub-system 110 of FIG. 3 can be implemented in a way as in FIG. 1 with a loadable portion 141 and a readable portion 143. As in FIG. 2, the loadable portion 141 is accessible to the host system 120 over the connection 103 via one protocol 145 for cache-coherent memory access; and the readable portion 143 is accessible to the host system 120 over the connection 103 via another protocol 147 for storage access.

In FIG. 3, storage access queues 134 are configured in the loadable portion 141 of the memory sub-system 110 such that the host system 120 can use the storage access queues 134 and the cache-coherent memory access protocol 145 for accessing the storage services implemented in the readable portion 143.

For example, the host system 120 can use the cache-coherent memory access protocol 145 to enter read commands in the storage access queues 134 to request the memory sub-system 110 to retrieve data 181 from the readable portion 143. Similarly, the host system 120 can use the cache-coherent memory access protocol 145 to enter write commands into the storage access queues 134 to request the memory sub-system 110 to write data 181 into the readable portion 143. Thus, the host system 120 does not have to allocate a portion of its memory 129 to host the storage access queues for accessing the readable portion 143; and the host system 120 does not have to use the storage access protocol 147 over the connection to access the readable portion 143.

For example, the host system 120 can execute store instructions to store, using the cache-coherent memory access protocol 145, storage access messages into the storage access queues 134. Since the loadable portion 141 is within the memory sub-system 110, the processing device 117 can retrieve the storage access messages from the storage access queues 134 without using an external connection (e.g., 103) and/or without using the storage access protocol 147.

The processing device 117 can be configured via the firmware 153 to retrieve read commands and write commands from the storage access queues 134 in the loadable portion 141 without using the storage access protocol 147. The processing device 117 can execute, within the memory sub-system 110 to retrieve data 181 from the readable portion 143 and to write data 181 into readable portion 143, the read commands and write commands retrieved from the loadable portion 141, in a same way as executions of similar commands retrieved, using the storage access protocol 147 over the connection 103, from storage access queues 133 configured in the memory 129 of the host system 120.

After execution of a read command retrieved from the storage access queues 134 in the loadable portion 141, the processing device 117 of the memory sub-system 110 can place the data 181 retrieved from the readable portion 143 into the loadable portion 141 (e.g., in the storage access queues 134, or other locations). The host system 120 can retrieve the data 181 from the loadable portion 141 (e.g., from the storage access queues 134, or other locations) via executing load instructions and using the cache-coherent memory access protocol 145 over the connection 103.

After execution of a read command from the host system 120, the memory sub-system 110 can store or buffer the data 181 retrieved from the readable portion 143 into the buffer memory 149. The processing device 117 of the memory sub-system 110 can be configured via the firmware 153 to optionally provide the retrieved data 181 from the buffer memory 149 to the host system 120 without going through the loadable portion 141. For example, the retrieved data 181 can be provided by the memory sub-system 110 from the buffer memory 149 to storage access queues 133 configured in the memory 129 of the host system 120 using the storage access protocol 147 over the connection. Alternatively, the retrieved data 181 can be provided to the host system 120 via the loadable portion 141 over the connection 103 using the cache-coherent memory access protocol 145.

In some implementations, the processing device 117 of the memory sub-system 110 can retrieve a read command from the storage access queues 133 configured in the memory 129 of the host system 120 using the storage access protocol 147. After the execution of the read command, the processing device 117 of the memory sub-system 110 can place the retrieved data 181 into the loadable portion 141 (e.g., in the storage access queues 134, or other locations) for access by the host system 120 via load instructions and the cache-coherent memory access protocol 145. Alternatively, the retrieved data 181 can be provided to the host system 120 over the connection 103 using the storage access protocol 147.

The memory sub-system 110 can execute write commands received from the host system 120 (e.g., retrieved from the storage access queues 134 configured in the loadable portion 141 or from storage access queues 133 configured in the memory 129 of the host system). For execution of the write commands, the processing device 117 of the memory sub-system 110 can retrieve data 181 of the write commands from the loadable portion 141 (e.g., storage access queues 134, or other locations). For example, the host system 120 can provide the data 181 of the write commands over the connection 103 using the cache-coherent memory access protocol 145. Alternatively, the memory sub-system 110 can receive the data of the write commands from the host system 120 over the connection using the storage access protocol 145.

After execution of a write command to write the data 181 into the readable portion 143, the processing device 117 can optionally use the storage access queue 134 to provide an indication of the completion of the write command.

For example, the indication of the completion of the write command can be in the form of the write command, previously in a storage access queue 134 configured in the loadable portion 141 (or a storage access queue 133 in the memory 129 of the host system 120), being vacated from the storage access queue 134 (or the storage access queue 133).

For example, the indication of the completion of the write command can be in the form of a response message (e.g., provided in a storage access queue 134 or 133). The response message is configured to indicate the completion of the write command.

In some implementations, the processing device 117 of the memory sub-system 110 can retrieve a write command from the loadable portion 141. For execution of the write command, the processing device 117 of the memory sub-system 110 can be configured via the firmware 153 to retrieve the data 181 to be written from storage access queues 133 configured in the memory 129 of the host system 120 using the storage access protocol 147 over the connection. The memory sub-system 110 can place the retrieved data 181 in the buffer memory 149 for and during the execution of the write command.

In some implementations, the processing device 117 of the memory sub-system 110 can retrieve a write command from the storage access queues 133 configured in the memory 129 of the host system 120 using the storage access protocol 147. For execution of the write command, the processing device 117 of the memory sub-system 110 can retrieve the data 181 to be written from the loadable portion 141 (e.g., the storage access queues 134 or other locations). The processing device 117 can use the data 181 in the loadable portion 141 for and during the execution of the write command.

Optionally, the host system 120 can allocate the storage access queues 134 in the loadable portion 141 of the memory sub-system 110 to store one set of storage access requests addressed to the readable portion 143; and the host system 120 can allocate the storage access queues 133 in the memory 129 of the host system 120 to store another set of storage access requests addressed to the readable portion 143 of the memory sub-system 110.

For example, requests from an application or a routine of the operating system 135 can be configured to use the storage access queues 134 in the loadable portion 141 of the memory sub-system 110; and requests from another application or another routine of the operating system 135 can be configured to use the storage access queues 133 in the memory 129 of the host system 120.

Figure 4:
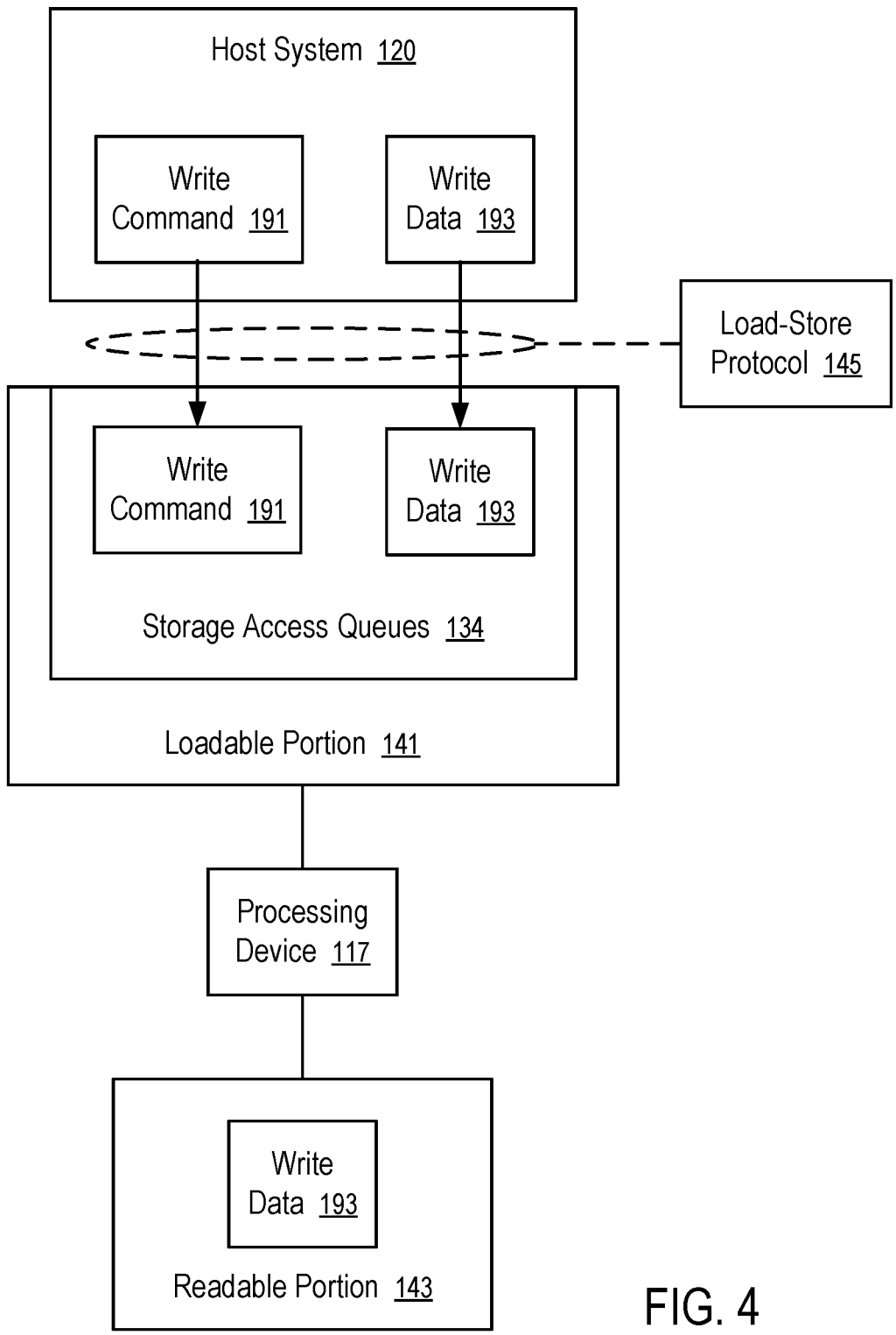
FIG. 4 illustrates the use of storage access queues in a memory sub-system to execute a write command according to one embodiment.

FIG. 4 illustrates the use of storage access queues in a memory sub-system to execute a write command according to one embodiment. For example, the execution of the write command in FIG. 4 can be implemented in a computing system of FIG. 3.

In FIG. 4, the host system 120 configures storage access queues 134 in a loadable portion 141 of a memory sub-system 110. The host system 120 can access the loadable portion 141 using a cache-coherent memory access protocol 145 over a connection 103 (e.g., a computer express link (CXL) connection) between the host system 120 and the memory sub-system 110.

Using the cache-coherent memory access protocol 147, the host system 120 can enter a write command 191 and the data 193 to be written via the write command 191 into the storage access queues 134.

Since the loadable portion 141 is internal to the memory sub-system 110, a processing device 117 of the memory sub-system 110 can be configured (e.g., via firmware 153) to execute the write command 191 in the storage access queues 134 to write the data 193 into the readable portion 143.

The data 193 written into the readable portion 143 can be accessible to the host system 120 via the connection 103 using the storage access protocol 147, as in FIG. 2.

FIG. 5 illustrates the use of storage access queues in a memory sub-system to execute a read command according to one embodiment. For example, the execution of the read command in FIG. 5 can be implemented in a computing system of FIG. 3.

In FIG. 5, the host system 120 configures storage access queues 134 in a loadable portion 141 of a memory sub-system 110. The host system 120 can access the loadable portion 141 using a cache-coherent memory access protocol 145 over a connection 103 (e.g., a computer express link (CXL) connection) between the host system 120 and the memory sub-system 110.

Using the cache-coherent memory access protocol 147, the host system 120 can enter a read command 195 into the storage access queues 134.

Since the loadable portion 141 is internal to the memory sub-system 110, a processing device 117 of the memory sub-system 110 can be configured (e.g., via firmware 153) to execute the read command 195 in the storage access queues 134 and retrieve the data 197 from the readable portion 143.

The retrieved data 197 can be placed in the storage access queues 134 in response to the read command 195. The host system 120 can load the data 197 from the storage access queues 134 using the cache-coherent memory access protocol 145.

For example, the data 197 being read from the readable portion 143 can be written into the readable portion 143 in a way as in FIG. 4, or via the storage access protocol 147 over the connection 103 as in FIG. 2.

Figure 6:
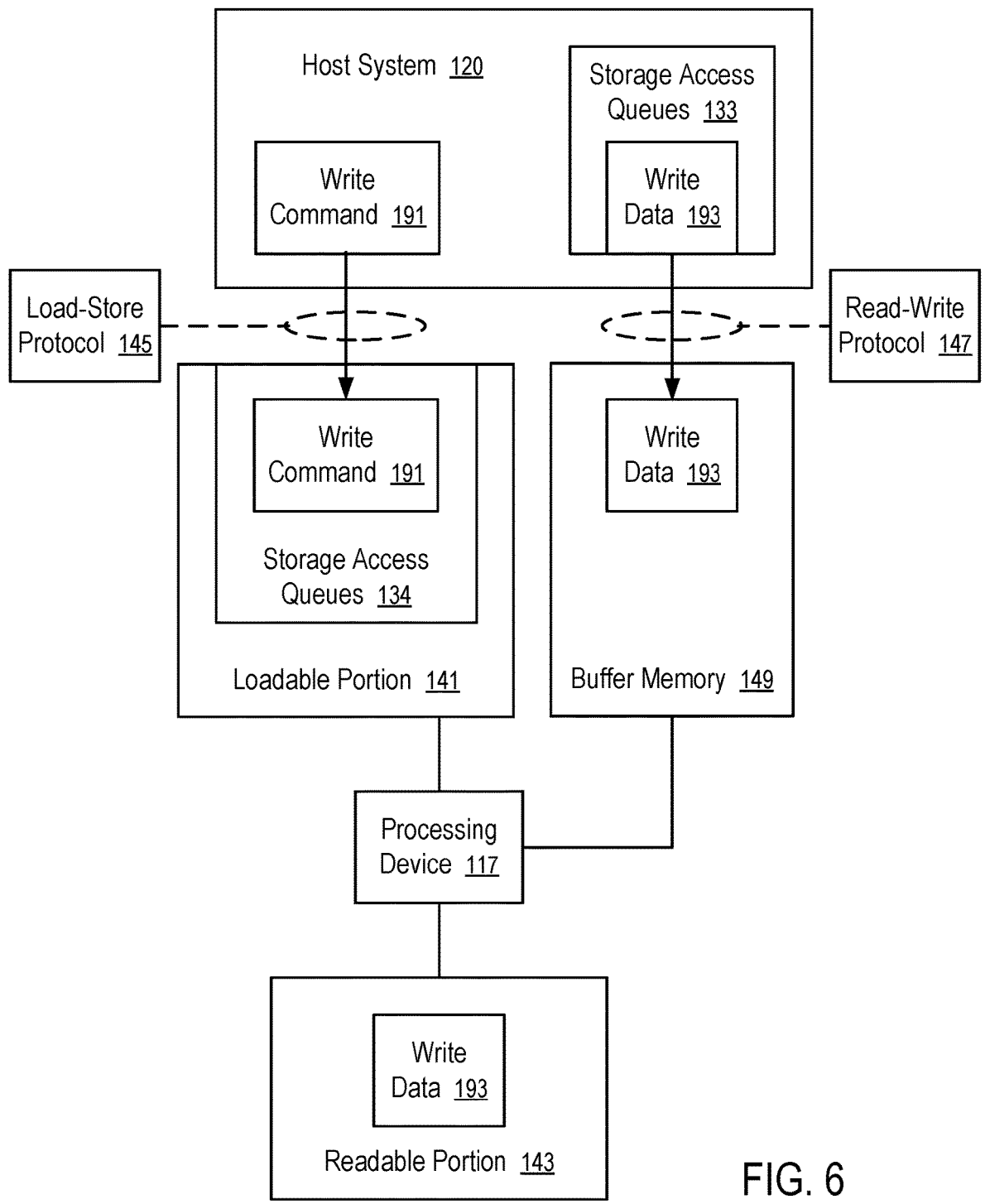
FIG. 6 illustrates the execution of a write command according to one embodiment.

FIG. 6 illustrates the execution of a write command according to one embodiment. For example, the execution of the write command in FIG. 6 can be implemented in a computing system of FIG. 3.

In FIG. 6, the host system 120 configures storage access queues 134 in a loadable portion 141 of a memory sub-system 110. The host system 120 can access the loadable portion 141 using a cache-coherent memory access protocol 145 over a connection 103 (e.g., a computer express link (CXL) connection) between the host system 120 and the memory sub-system 110. Further, the host system 120 has storage access queues 133 configured in its memory (e.g., 129) to access the readable portion 143 using a storage access protocol 147 over the connection 103 between the host system 120 and the memory sub-system 110.

Using the cache-coherent memory access protocol 147, the host system 120 can enter a write command 191 into the storage access queues 134 in the loadable portion 141.

Using the storage access protocol 147, the host system 120 can provide the data 193 to be written via the write command 191 using the storage access queues 133 configured in the memory 129 of the host system 120.

Since the loadable portion 141 is internal to the memory sub-system 110, The processing device 117 of the memory sub-system 110 can be configured (e.g., via firmware 153) to retrieve the write command 191 directly from the loadable portion 141 for execution. For execution of the write command 191, the processing device 117 can retrieve the data 193 to be written using the storage access protocol 147 over the connect 103.

Figure 7:
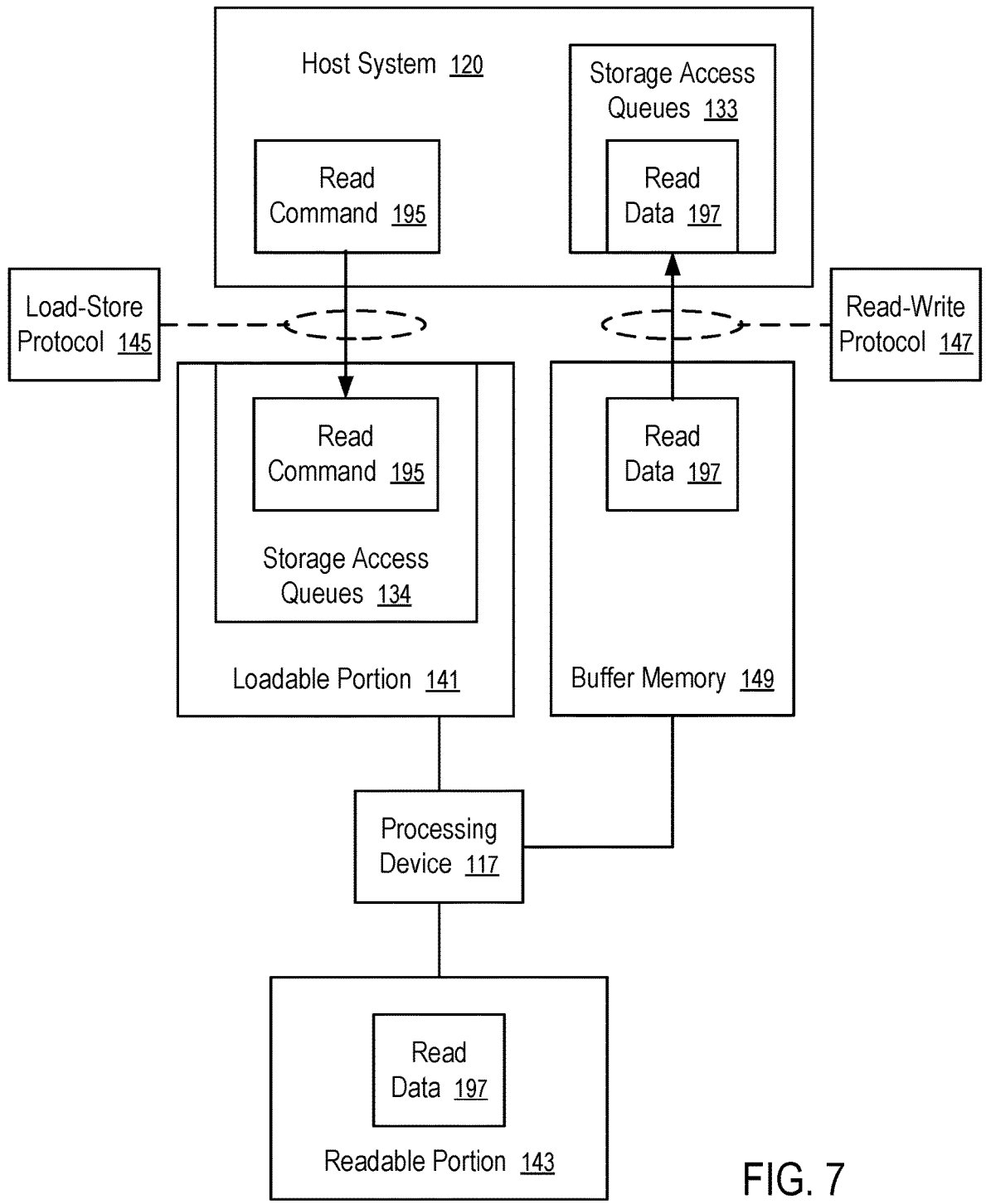
FIG. 7 illustrates the execution of a read command according to one embodiment.

For example, the data 193 written into the readable portion 143 can be accessible to the host system 120 via the connection 103 using the storage access protocol 147 as in FIG. 2, or via the loadable portion 141 as in FIG. 5 or FIG. 7.

FIG. 7 illustrates the execution of a read command according to one embodiment. For example, the execution of the read command in FIG. 7 can be implemented in a computing system of FIG. 3.

In FIG. 7, the host system 120 configures storage access queues 134 in a loadable portion 141 of a memory sub-system 110. The host system 120 can access the loadable portion 141 using a cache-coherent memory access protocol 145 over a connection 103 (e.g., a computer express link (CXL) connection) between the host system 120 and the memory sub-system 110. Further, the host system 120 has storage access queues 133 configured in its memory (e.g., 129) to access the readable portion 143 using a storage access protocol 147 over the connection 103 between the host system 120 and the memory sub-system 110.

Using the cache-coherent memory access protocol 147, the host system 120 can enter a read command 195 into the storage access queues 134.

Since the loadable portion 141 is internal to the memory sub-system 110, a processing device 117 of the memory sub-system 110 can be configured (e.g., via firmware 153) to execute the read command 195 in the storage access queues 134 and retrieve the data 197 from the readable portion 143.

The retrieved data 197 can be placed in a buffer memory 149 of the memory sub-system 110 in response to the read command 195. The memory sub-system 110 can provide the data 197 from the buffer memory 149 to the storage access queues 133 in the memory of the host system 120 using the storage access protocol 147.

For example, the data 197 being read from the readable portion 143 can be written into the readable portion 143 in a way as in FIG. 4 or FIG. 6, or via the storage access protocol 147 over the connection 103 as in FIG. 2.

Figure 8:
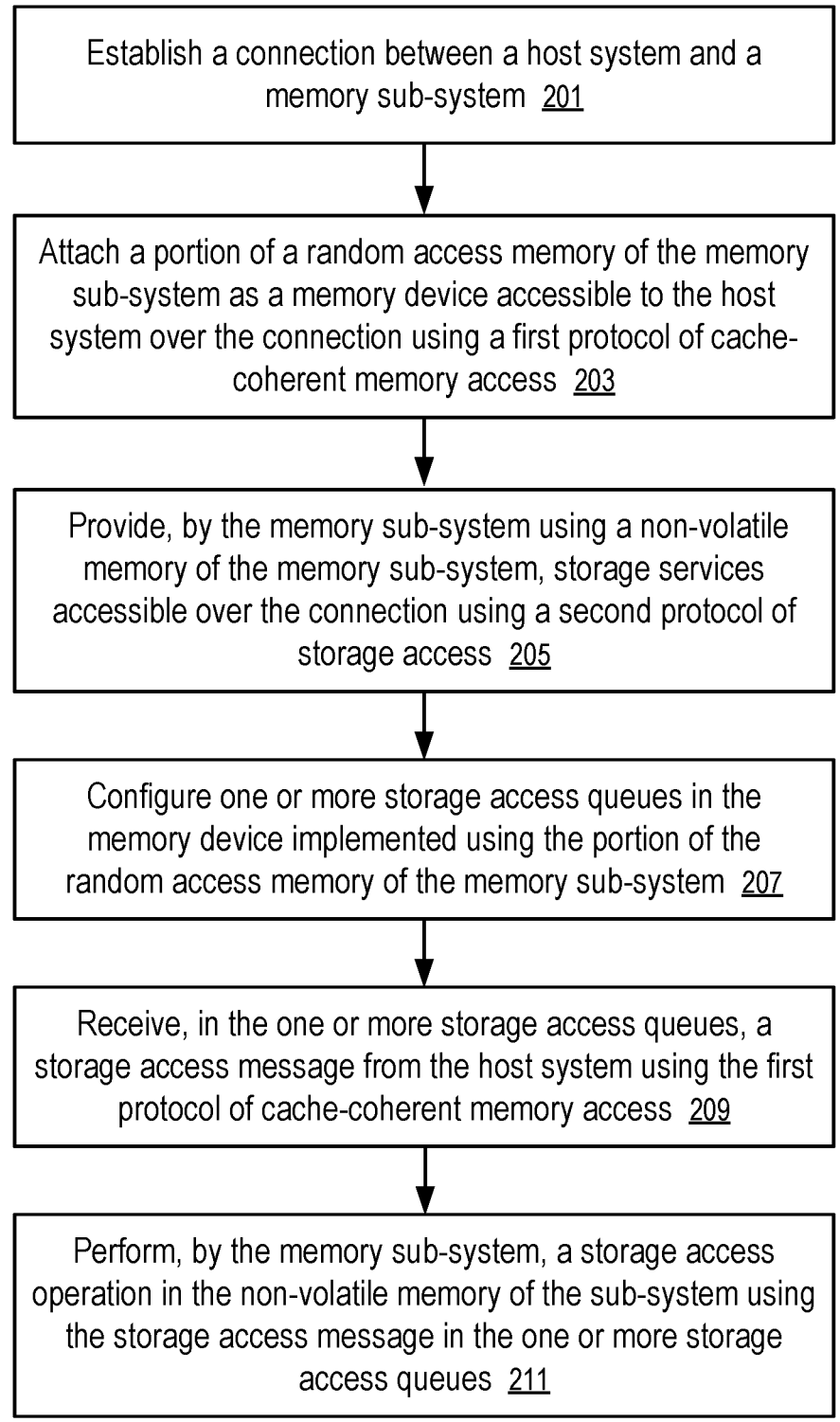
FIG. 8 shows a method to access the storage services of a memory sub-system according to one embodiment.

FIG. 8 shows a method to access the storage services of a memory sub-system according to one embodiment. For example, the method of FIG. 8 can be implemented in computing systems 100 of FIG. 1 and FIG. 2 with the techniques of FIG. 3 to use the memory services of a memory sub-system 110 to communicate storage access messages.

At block 201, a connection 103 is established between a host system 120 and a memory sub-system 110.

For example, the memory sub-system 110 (e.g., a solid-state drive) and the host system 120 can be connected via at least one physical connection 103.

For example, the connection 103 can be implemented in accordance with a standard of computer express link (CXL) to support both a cache-coherent memory access protocol 145 and a storage access protocol 147.

At block 203, a portion 141 of a random access memory 138 of the memory sub-system 110 is attached as a memory device accessible to the host system 120 over the connection 103 using a first protocol 145 of cache-coherent memory access.

For example, the memory sub-system 110 can optically carve out a portion (e.g., loadable portion 141) of its fast random access memory (e.g., 138) as a memory device attached to the host system 120 over the connection 103. The memory sub-system 110 can reserve another portion of its fast random access memory (e.g., 138) as a buffer memory 149 for internal use by its processing device(s) (e.g., 117).

Optionally, the memory sub-system 110 can have a backup power source 105 designed to guarantee that data stored in at least a portion of volatile random access memory 138 is saved in a non-volatile memory 139 when the power supply to the memory sub-system 110 is disrupted. Thus, such a portion of the volatile random access memory 138 can be considered non-volatile in the memory services to the host system 120.

At block 205, the memory sub-system 110 provides, using a non-volatile memory 139 of the memory sub-system 110, storage services accessible over the connection 103 using a second protocol 147 of storage access.

For example, the memory sub-system 110 can have a portion (e.g., readable portion 143) of its memory resources (e.g., non-volatile memory 139) configured as a storage device attached to the host system 120 over the connection 103.

At block 207, one or more storage access queues 134 are configured in the memory device implemented using the portion of the random access memory 138 of the memory sub-system 110.

For example, the one or more storage access queues 134 are configured in the loadable portion 141 of the memory sub-system 110. Thus, the host system 120 can access the one or more storage access queues 134 over the connection 103 using the first protocol 145 of cache-coherent memory access; and the processing device 117 of the memory sub-system 110 can access the one or more storage access queues 134 locally within the memory sub-system 110.

Optionally, second storage access queues 133 can be configured in a memory 129 of the host system 120. The memory sub-system 110 can access the second storage access queues 133 over the connection 103 using the second protocol 147 of storage access.

At block 209, the memory sub-system 110 receives, in the one or more storage access queues 134, a storage access message from the host system 120 using the first protocol 145 of cache-coherent memory access.

For example, the storage access message can be transmittable from the host system 120 to the memory sub-system 110 over the connection 103 using the second protocol 147 of storage access. Thus, the host system 120 can have the option to store the storage access message into the one or more storage access queues 134 in the fast random access memory 138 of the memory sub-system 110 using the first protocol 145 of cache-coherent memory access over the connection 103, or the option to store the storage access message into second storage access queues 133 configured in the memory 129 of the host system 120 for retrieval by the memory sub-system 110 using the second protocol 147 of storage access over the connection 103.

For example, the host system 120 can optionally allocate the one or more storage access queues (e.g., 133) to storage services associated with requests from a first routine or application running in the host system 120, and allocate the second storage access queues (e.g., 134) to storage services associated with requests from a second routine or application running in the host system 120.

For example, the host system 120 can optionally allocate the one or more storage access queues configured in the memory sub-system 110 for communications of read and write commands, and allocate the second storage access queues configured in the host system 120 for communications of data retrieved via the read commands and data to be written via the write commands.

For example, the host system 120 can optionally allocate the second storage access queues configured in the memory 129 of the host system 120 for communications of read commands and write commands, and allocate the one or more storage access queues configured in the faster random access memory 138 of the memory sub-system 110 for communications of data retrieved via the read commands and data to be written via the write commands.

At block 211, the memory sub-system 110 performs a storage access operation in the non-volatile memory 139 of the sub-system 110 using the storage access message in the one or more storage access queues.

For example, the storage access message can include a read command 195; and the storage access operation can include execution of the read command 195 to retrieve first data 197 from the non-volatile memory 139 of the memory sub-system 110.

After the execution of the read command 195, the memory sub-system 110 can be configured via the firmware 153 to provide the first data 197 in the memory device attached by the memory sub-system 110 over the connection 103 for retrieval by the host system 120 using the first protocol 145 of cache-coherent memory access. For example, the first data 197 can be provided to the host system 120 via the one or more storage access queues 134 configured in the loadable portion 141 of the memory sub-system 110, as in FIG. 5.

Alternatively, the memory sub-system 110 can provide the first data 197 from the buffer memory 149 of the memory sub-system 110 to the host system 120 over the connection 103 using the second protocol 147 of storage access, as in FIG. 7.

For example, the storage access message can include a write command 191. For execution of the write command 191, the memory sub-system 110 receives, from the host system 120 over the connection 103 using the first protocol 145 of cache-coherent memory access, second data 193. The storage access operation includes execution of the write command 191 to write the second data 193 into the non-volatile memory 139 of the memory sub-system 110. For example, the second data 193 can be received from the host system 120 over the connection 103 using the first protocol 145 of cache-coherent memory access in the one or more storage access queues 134, as in FIG. 4.

Alternatively, for the execution of the write command 191, the memory sub-system 110 can receive from the host system 120 over the connection 103 using the second protocol 147 of storage access, the second data 193 to be written via the write command 191, as in FIG. 6. The storage access operation can include the execution of the write command 191 to write the second data 193 into the non-volatile memory 139 of the memory sub-system 110.

For example, the storage access message can include the second data 193 to be written via a write command 191. The write command 191 can be received via the one or more storage access queues 134 configured in the memory sub-system 110, or the second storage access queues 133 configured in the memory 129 of the host system.

For example, the storage access message can include the first data 197 retrieved from the readable portion 143 via a read command 195. The read command 195 can be received via the one or more storage access queues 134 configured in the memory sub-system 110, or the second storage access queues 133 configured in the memory 129 of the host system.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 127) and a software stack executed by the processor chipset. The processor chipset can include one or more cores, one or more caches (e.g., 123), a memory controller (e.g., controller 125) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface 113. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system 120 and the memory sub-system 110. The host system 120 can further utilize an NVM express (NVMe) interface to access components (e.g., memory devices 109) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 127 of the host system 120 can be, for example, a microprocessor, a central processing unit (CPU), a processing core of a processor, an execution unit, etc. In some instances, the controller 125 can be referred to as a memory controller, a memory management unit, and/or an initiator. In one example, the controller 125 controls the communications over a bus coupled between the host system 120 and the memory sub-system 110. In general, the controller 125 can send commands or requests to the memory sub-system 110 for desired access to memory devices 109, 107. The controller 125 can further include interface circuitry to communicate with the memory sub-system 110. The interface circuitry can convert responses received from the memory sub-system 110 into information for the host system 120.

The controller 125 of the host system 120 can communicate with the controller 115 of the memory sub-system 110 to perform operations such as reading data, writing data, or erasing data at the memory devices 109, 107 and other such operations. In some instances, the controller 125 is integrated within the same package of the processing device 127. In other instances, the controller 125 is separate from the package of the processing device 127. The controller 125 and/or the processing device 127 can include hardware such as one or more integrated circuits (ICs) and/or discrete components, a buffer memory, a cache memory, or a combination thereof. The controller 125 and/or the processing device 127 can be a microcontroller, special purpose logic circuitry (e.g., a field programmable gate array (FPGA), an application specific integrated circuit (ASIC), etc.), or another suitable processor.

The memory devices 109, 107 can include any combination of the different types of non-volatile memory components and/or volatile memory components. The volatile memory devices (e.g., memory device 107) can be, but are not limited to, random-access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 109 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 109 can include one or more arrays of memory cells such as SLCs, MLCs, TLCs, QLCS, PLCs, or any combination of such. In some embodiments, a particular memory device can include an SLC portion, an MLC portion, a TLC portion, a QLC portion, and/or a PLC portion of memory cells. The memory cells of the memory devices 109 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 109 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), spin transfer torque (STT)-MRAM, conductive bridging RAM (CBRAM), resistive random-access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 109 to perform operations such as reading data, writing data, or erasing data at the memory devices 109 and other such operations (e.g., in response to commands scheduled on a command bus by controller 125). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 109. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 109. The controller 115 can further include host interface circuitry to communicate with the host system 120 via the physical host interface. The host interface circuitry can convert the commands received from the host system into command instructions to access the memory devices 109 as well as convert responses associated with the memory devices 109 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 109.

In some embodiments, the memory devices 109 include local media controllers 137 that operate in conjunction with the memory sub-system controller 115 to execute operations on one or more memory cells of the memory devices 109. An external controller (e.g., memory sub-system controller 115) can externally manage the memory device 109 (e.g., perform media management operations on the memory device 109). In some embodiments, a memory device 109 is a managed memory device, which is a raw memory device combined with a local controller (e.g., local media controller 137) for media management within the same memory device package. An example of a managed memory device is a managed NAND (MNAND) device.

In one embodiment, an example machine of a computer system within which a set of instructions, for causing the machine to perform any one or more of the methodologies discussed herein, can be executed. In some embodiments, the computer system can correspond to a host system (e.g., the host system 120 of FIG. 1) that includes, is coupled to, or utilizes a memory sub-system (e.g., the memory sub-system 110 of FIG. 1) or can be used to perform the operations discussed above (e.g., to execute instructions to perform operations corresponding to operations described with reference to FIG. 1). In alternative embodiments, the machine can be connected (e.g., networked) to other machines in a LAN, an intranet, an extranet, and/or the internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random-access memory (DRAM) such as synchronous DRAM (SDRAM) or Rambus DRAM (RDRAM), static random-access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable medium, data storage system, and/or main memory can correspond to the memory sub-system 110 of FIG. 1.

In one embodiment, the instructions include instructions to implement functionality discussed above (e.g., the operations described with reference to FIG. 1). While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
  establishing a connection between a host system and a memory sub-system;
  attaching a portion of a random access memory of the memory sub-system as a memory device accessible to the host system over the connection using a first protocol of cache-coherent memory access;
  providing, by the memory sub-system using a non-volatile memory of the memory sub-system, storage services accessible over the connection using a second protocol of storage access;
  configuring one or more storage access queues in the memory device implemented using the portion of the random access memory of the memory sub-system;
  receiving, in the one or more storage access queues, a storage access message from the host system using the first protocol of cache-coherent memory access; and
  performing, by the memory sub-system, a storage access operation in the non-volatile memory of the sub-system using the storage access message in the one or more storage access queues.

2. The method of claim 1, wherein the connection is in accordance with a standard of computer express link (CXL).

3. The method of claim 2, wherein the storage access message is transmittable from the host system to the memory sub-system over the connection using the second protocol of storage access.

4. The method of claim 3, wherein the storage access message includes a read command; and the storage access operation includes execution of the read command to retrieve first data from the non-volatile memory of the memory sub-system.

5. The method of claim 4, further comprising:
  providing, by the memory sub-system, the first data in the memory device for retrieval using the first protocol of cache-coherent memory access.

6. The method of claim 5, wherein the first data is provided in the one or more storage access queues.

7. The method of claim 4, further comprising:
providing, by the memory sub-system, the first data to the host system over the connection using the second protocol of storage access.

8. The method of claim 3, wherein the storage access message includes a write command; and the method further comprises:
receiving, by the memory sub-system from the host system over the connection using the first protocol of cache-coherent memory access, second data, wherein the storage access operation includes execution of the write command to write the second data into the non-volatile memory of the memory sub-system.

9. The method of claim 8, wherein the second data is received from the host system over the connection using the first protocol of cache-coherent memory access in the one or more storage access queues.

10. The method of claim 3, wherein the storage access message includes a write command; and the method further comprises:
receiving, by the memory sub-system from the host system over the connection using the second protocol of storage access, second data, wherein the storage access operation includes execution of the write command to write the second data into the non-volatile memory of the memory sub-system.

11. A memory sub-system, comprising:
a host interface operable on a connection to a host system;
a volatile memory, wherein the memory sub-system is operable to allocate a portion of the volatile memory to provide memory services to the host system over the connection using a first protocol of cache-coherent memory access;
a non-volatile memory operable to provide storage services to the host system over the connection using a second protocol of storage access; and
a controller configured to:
establish one or more storage access queues in the volatile memory;
communicate first storage access messages with the host system via the one or more storage access queues using the first protocol of cache-coherent memory access over the connection; and
provide the storage services using the first storage access messages communicated from the host system over the connection using the first protocol of cache-coherent memory access.

12. The memory sub-system of claim 11, wherein the connection is a computer express link (CXL) connection.

13. The memory sub-system of claim 11, wherein the controller is further configured to communicate second storage access messages with the host system via storage access queues, configured in a memory of the host system, using the second protocol of storage access over the connection; and the storage services are provided further based on the second storage access messages.

14. The memory sub-system of claim 13, wherein the second storage access messages include a read command; and the first storage access messages include first data retrieved from the non-volatile memory via execution of the read command.

15. The memory sub-system of claim 14, wherein the second storage access messages include a write command; and the first storage access messages include second data written into the non-volatile memory via execution of the write command.

16. The memory sub-system of claim 13, wherein the first storage access messages include a read or write command data retrieved from or written into the non-volatile memory via execution of the read or write command.

17. A non-transitory computer storage medium storing instructions which, when executed in a computing system, cause the computing system to perform a method, comprising:
establishing a connection between a host system of the computing system and a memory sub-system of the computing system;
configuring one or more storage access queues in a memory device attached by the memory sub-system to the host system over the connection; and
communicating first storage access messages between the host system and the memory sub-system via the one or more storage access queues using a first protocol of cache-coherent memory access over the connection;
wherein the memory sub-system is configured to provide storage services using the first storage access messages communicated from the host system over the connection using the first protocol of cache-coherent memory access.

18. The non-transitory computer storage medium of claim 17, wherein the method further comprises:
configuring second storage access queues in a memory of the host system; and
communicating second storage access messages between the host system and the memory sub-system via the second storage access queues using a second protocol of storage access over the connection.

19. The non-transitory computer storage medium of claim 18, wherein the method further comprises:
allocating the one or more storage access queues to storage services associated with requests from a first routine or application; and
allocating the second storage access queues to storage services associated with requests from a second routine or application.

20. The non-transitory computer storage medium of claim 18, wherein the connection is a computer express link (CXL) connection.

* * * * *